(12) United States Patent
Kozawa et al.

(10) Patent No.: US 8,328,956 B2
(45) Date of Patent: Dec. 11, 2012

(54) CARBONITRIDED INDUCTION HARDENED STEEL PART SUPERIOR IN SURFACE FATIGUE STRENGTH AT HIGH TEMPERATURE AND METHOD OF PRODUCTION OF SAME

(75) Inventors: Shuji Kozawa, Tokyo (JP); Atsushi Mizuno, Muroran (JP); Tatsuro Ochi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 461 days.

(21) Appl. No.: 12/450,544

(22) PCT Filed: Oct. 22, 2008

(86) PCT No.: PCT/JP2008/069577
§ 371 (c)(1),
(2), (4) Date: Sep. 28, 2009

(87) PCT Pub. No.: WO2009/054530
PCT Pub. Date: Apr. 30, 2009

(65) Prior Publication Data
US 2010/0139811 A1    Jun. 10, 2010

(30) Foreign Application Priority Data
Oct. 24, 2007 (JP) .................. 2007-276887

(51) Int. Cl.
*C22C 38/00*    (2006.01)
*B32B 15/04*    (2006.01)
*C21D 6/00*    (2006.01)
*C23C 8/80*    (2006.01)

(52) U.S. Cl. ..................... 148/318; 148/218

(58) Field of Classification Search .......... 148/218, 148/318
See application file for complete search history.

(56) References Cited

U.S. PATENT DOCUMENTS
5,545,267 A * 8/1996 Ochi et al. ............... 148/335
2004/0256029 A1 * 12/2004 Takayama et al. ........ 148/218
2009/0276992 A1 * 11/2009 Maeda et al. ............. 29/428

FOREIGN PATENT DOCUMENTS
JP    07-190173    7/1995
(Continued)

OTHER PUBLICATIONS
Direct Hardening. efunda, 2012.*
International Search Report dated Feb. 3, 2009 issued in corresponding PCT Application No. PCT/JP2008/069577.
(Continued)

*Primary Examiner* — Jessica L Ward
*Assistant Examiner* — Alexander Polyansky
(74) *Attorney, Agent, or Firm* — Kenyon & Kenyon LLP

(57) ABSTRACT

The present invention provides a gear, continuously variable transmission, constant velocity joint, hub, or other steel part superior in surface fatigue strength compared with the past and method of production of the same, that is, provides a carbonitrided induction hardened steel part made of steel comprised of a specific composition of chemical ingredients and carbonitrided, then treated by induction hardening, the steel part characterized in that a surface N concentration is 0.1 to 0.8 mass %, a sum of an N concentration and C concentration is 1.0 to 2.0 mass %, an amount of surface residual austenite is less than 15 vol %, a depth of the incompletely hardened layer from the surface is less than 5 μm, and a surface X-ray diffraction half width is 6.0 degrees or more, and a method of production of the same.

8 Claims, 1 Drawing Sheet

FOREIGN PATENT DOCUMENTS

| | | |
|---|---|---|
| JP | 10-103440 | 4/1998 |
| JP | 2001-181785 | 7/2001 |
| JP | 2003-55711 | 3/2003 |
| JP | 2006-292139 | 10/2006 |
| JP | 2007-182926 | * 7/2007 |
| WO | WO 2008/007509 | * 1/2008 |

OTHER PUBLICATIONS

N. Ishii, *"Abnormal Surface Layer and Improvement of Fatigue Strength of Carburized Steel,"* Journal of the Japan Society for Heat Treatment 30(5): 240-246 (1990).

* cited by examiner

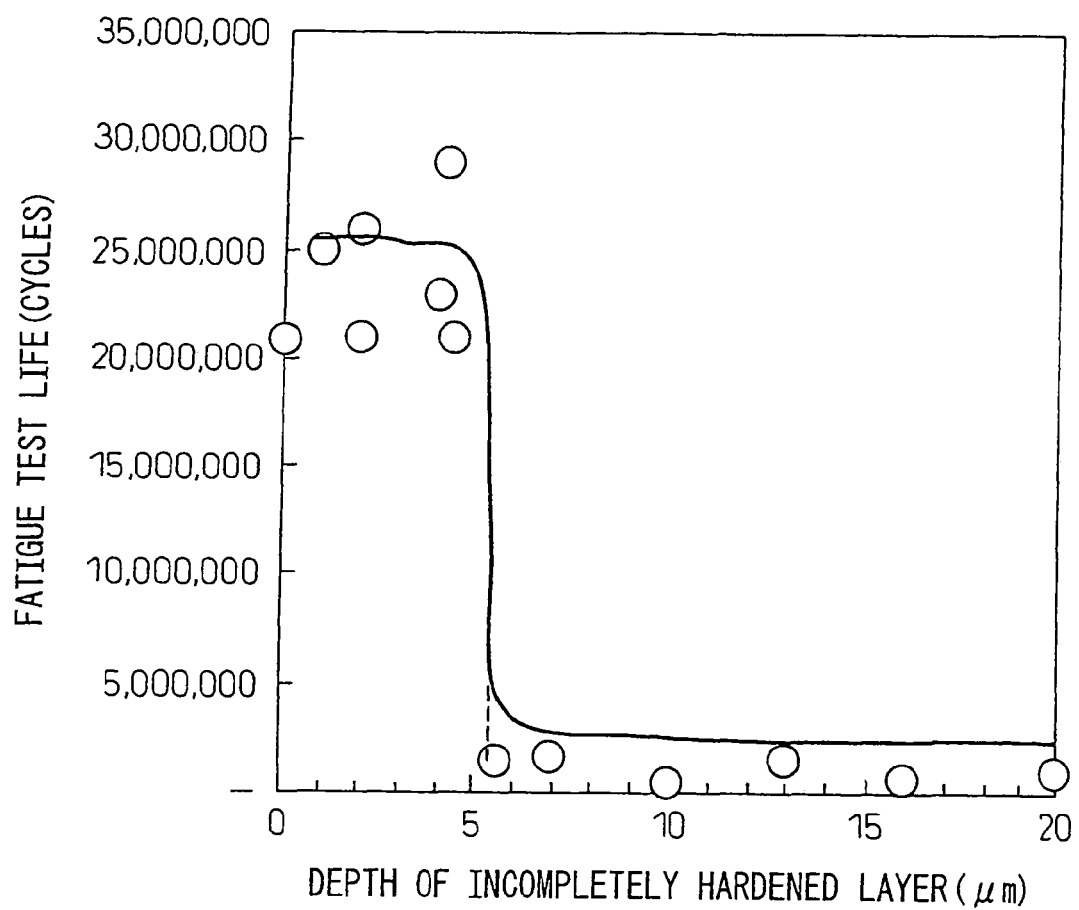

CARBONITRIDED INDUCTION HARDENED STEEL PART SUPERIOR IN SURFACE FATIGUE STRENGTH AT HIGH TEMPERATURE AND METHOD OF PRODUCTION OF SAME

This application is a national stage application of International Application No. PCT/JP2008/069577, filed 22 Oct. 2008, which claims priority to Japanese Application No. 2007-276887, filed 24 Oct. 2007, which is incorporated by reference in its entirety.

TECHNICAL FIELD

The present invention relates to a carbonitrided induction hardened steel part, particularly relates to a gear, continuously variable transmission, constant velocity joint, hub, etc. applied to machine structural part, in particular a power transmission part for an automobile etc.

BACKGROUND ART

Machine structural parts, for example, gears of automatic transmissions or sheaves of continuously variable transmissions, constant velocity joints, hubs, and other power transmission parts, are required to have surface fatigue strength. In the past, generally the above parts were made from a material of case hardened steel such as JIS SCr420, SCM420, etc. having a C of around 0.2% and were hardened by carburization to obtain a martensite structure having a C at the surface of the part of around 0.8% so as to improve the surface fatigue strength.

In recent years, along with the increasing stringency of the usage conditions, improvement in the surface fatigue strength has been sought. In place of the conventional carburization hardening, carbonitridation with its more superior softening resistance is being focused on.

For example, Japanese Patent Publication (A) No. 7-190173 proposes nitridation or carbonitridation to make the nitrogen content 0.2% to 0.8%, then salt dipping for quenching for obtaining a higher strength and furthermore shot peening after the above treatment so as to further increase the strength.

Further, Japanese Patent Publication (A) No. 2006-292139 proposes carbonitridation and annealing, then induction hardening to provide a surface part with an amount of residual austenite of 15 vol % or more and thereby improve the peeling lifetime of a pinion shaft.

However, in recent years, along with further tougher usage conditions, under usage conditions, the operating surfaces have become stronger than 300° C. and weaker than 400° C. or much higher in temperature and therefore further improvement in the surface fatigue strength has been sought.

DISCLOSURE OF THE INVENTION

Accordingly the present invention has as its object the provision of a carbonitrided induction hardened steel part more superior in surface fatigue strength than the past, in particular a gear, continuously variable transmission, constant velocity joint, hub, or other steel part.

As explained above, the fact that through carbonitridation hardening for improvement of the softening resistance, the surface fatigue strength can be improved is known, but the inventors discovered that to improve the surface fatigue strength when the operating surfaces become much higher in temperature in recent years (stronger than 300° C. and weaker than 400° C.), at least the following matters (a) to (e) are necessary and thereby completed the present invention.

(a) Performing induction hardening after carbonitridation.
(b) Using carbonitridation to obtain a surface N concentration of 0.1 to 0.8 mass % and a sum of the N concentration and C concentration of 1.0 to 2.0 mass %.
(c) Limiting the amount of residual austenite in the structure after induction hardening to less than 15 vol %.
(d) Limiting the depth of the surface incompletely hardened layer to less than 5 μm
(e) Having a surface X-ray diffraction half width of 6.0 degrees or more. (Note that the "surface" referred to in the present invention means the outermost surface.)

That is, the gist of the present invention is as follows:

(1) A carbonitrided induction hardened steel part superior in surface fatigue strength at high temperature comprised of steel including, as chemical ingredients, by mass %, C: 0.005 to 0.8%, Si: 2.0% or less, Mn: 0.2 to 3.0%, P: 0.03% or less, S: 0.005 to 0.10%, Ni: 3.0% or less (including 0%), Cr: 5.0% or less (including 0%), Mo: 2.0% or less (including 0%), W: 1.0% or less (including 0%), B: 0.0050% or less (including 0%), O: 0.0050% or less, and N: 0.003 to 0.03%, further containing one or both of Al: 0.005 to 0.2% and Ti: 0.005 to 0.2% and one or both of V: 0.3% or less (including 0%) and Nb: 0.3% or less (including 0%), and having a balance of substantially iron and unavoidable impurities, carbonitrided, then induction hardened, said steel part characterized in that a surface N concentration is 0.1 to 0.8 mass % and a sum of the N concentration and C concentration is 1.0 to 2.0 mass %, an amount of surface residual austenite is less than 15 vol %, a depth of the incompletely hardened layer from the surface is less than 5 μm, and a surface X-ray diffraction half width is 6.0 degrees or more.

(2) A carbonitrided induction hardened steel part superior in surface fatigue strength at high temperature as set forth in (1) characterized in that the chemical ingredients of the steel further contain, by mass %, one or more elements selected from the group of Ca: 0.0005 to 0.01%, Mg: 0.0005 to 0.01%, Zr: 0.0005 to 0.05%, and Te: 0.0005 to 0.1%.

(3) A carbonitrided induction hardened steel part superior in surface fatigue strength at high temperature as set forth in (1) or (2) characterized in that the steel part is either of a gear, continuously variable transmission, constant velocity joint, or hub.

(4) A method of production of a carbonitrided induction hardened steel part superior in surface fatigue strength at high temperature characterized by using steel including, as chemical ingredients, by mass %, C: 0.005 to 0.8%, Si: 2.0% or less, Mn: 0.2 to 3.0%, P: 0.03% or less, S: 0.005 to 0.10%, Ni: 3.0% or less (including 0%), Cr: 5.0% or less (including 0%), Mo: 2.0% or less (including 0%), W: 1.0% or less (including 0%), B: 0.0050% or less (including 0%), O: 0.0050% or less, and N: 0.003 to 0.03%, further including one or both of Al: 0.005 to 0.2% and Ti: 0.005 to 0.2% and one or both of V: 0.3% or less (including 0%) and Nb: 0.3% or less (including 0%), and having a balance of substantially iron and unavoidable impurities so as to form a part, carbonitriding it, then oil or salt quenching it, then induction heating it and hardening it by water or a polymer quenching agent of a temperature of less than 40° C. to give that part a surfacemost N concentration of 0.1 to 0.8 mass % and sum of the N concentration and C concentration of 1.0 to 2.0 mass %, making the amount of surface residual austenite less than 15 vol %, making the depth of the incompletely hardened layer from the surface less than 5 μm, and further making the surface X-ray diffraction half width 6.0 degrees or more.

(5) A method of production of a carbonitrided induction hardened steel part superior in surface fatigue strength at high temperature as set forth in (4) characterized in that the chemical ingredients of the steel further contain, by mass %, one or more elements selected from the group of Ca: 0.0005 to 0.01%, Mg: 0.0005 to 0.01%, Zr: 0.0005 to 0.05%, and Te: 0.0005 to 0.1%.

(6) A method of production of a carbonitrided induction hardened steel part superior in surface fatigue strength at high temperature as set forth in (4) or (5) characterized in that the steel part is either of a gear, continuously variable transmission, constant velocity joint, or hub.

BRIEF DESCRIPTION OF DRAWINGS

FIG. 1 is a view showing the relationship between a depth of an incompletely hardened layer and a fatigue test life.

BEST MODE FOR CARRYING OUT THE INVENTION

To use carbonitridation hardening to further improve the surface fatigue strength, it is effective to perform induction hardening after the carbonitridation. The reasons are the following (a) to (c).

(a) With just the conventional carbonitridation hardening, the surface austenite crystal grain number stops at around No. 8, while with carbonitridation followed by induction hardening with a heating temperature of 800° C. to 900° C., grains with an austenite crystal grain number of No. 10 or higher are obtained.

(b) The conventional carbonitridation hardening becomes hardening of the part as a whole, so for the cooling medium at the time of hardening, it is necessary to use oil or salt with relatively small cooling performances from the viewpoint of suppressing hardening strain. As opposed to this, the induction hardening is heating only the surfacemost part of the part. The core part is not hardened. For this reason, it is advantageous to suppress the hardening strain, so water cooling with a large cooling capacity becomes possible and the incompletely hardened layer unavoidably produced at the surface can be lightened.

Furthermore, the cooling method after the carbonitridation performed in advance of the induction hardening is preferably a method other than water quenching, for example, oil quenching or salt quenching, from the viewpoint of suppressing strain.

(c) Similarly, induction hardening has a large cooling ability and enables the amount of surface residual austenite to be suppressed more, so enables an increase in the amount of C and the amount of N in the carbonitridation and enables an increase in the softening resistance.

Further, the inventors discovered that the shot peening considered effective in the past was conversely harmful to the improvement of the surface fatigue strength in the case of a higher temperature than the past (stronger than 300° C. and weaker than 400° C.). In the past, it had been thought that shot peening had as one of its effects the improvement in hardness due to work hardening and therefore an improvement in the fatigue strength. However, when shot peening, with use under a high temperature (stronger than 300° C. and weaker than) environment, it was confirmed that rather the surface fatigue strength dropped compared with the case of no shot peening. The inventors considered the cause to be as follows:

Shot peening increases the hardness by work hardening after work deformation, hardening by increase of the residual stress of compression, and hardening by work-induced martensite transformation. However, among these, the increase in hardness due to work hardening by work deformation and hardening by increase of the residual stress of compression are not believed to contribute to the improvement in surface fatigue strength at a high temperature (stronger than 300° C. and weaker than 400° C.). The reason is that stronger than 300° C. and weaker than 400° C. is a temperature region in which relatively light movement of dislocations causes the majority of the work hardening and residual stress of compression to be released.

Therefore, the inventors thought that for improvement of the surface fatigue strength at a high temperature (stronger than 300° C. and weaker than 400° C.), improvement of the hardness of the structure itself after eliminating the effects of work hardening and residual stress of compression, that is, the martensite structure itself, is important.

The hardness of a martensite structure corresponds to the dislocation density. The magnitude of dislocation density corresponds to the X-ray diffraction half width, so by measuring the X-ray diffraction half width, it is possible to measure the hardness of the martensite structure per se, but studies by the inventors confirmed that by applying shot peening, the X-ray diffraction half width fell. This mechanism is not clear, but it is guessed that the shot peening causes work induced martensite transformation, but that beyond this, part of the martensite structure formed due to quenching is not recrystallized.

For the above reasons, the inventors believed that the improvement in hardness due to shot peening does not contribute to the improvement in surface fatigue strength at a high temperature (stronger than 300° C. and weaker than 400° C.) and rather causes a drop in the surface fatigue strength. For this reason, they thought that the hardness was insufficient as an indicator of the surface fatigue strength and thought that a preferable indicator would be the surface X-ray diffraction half width.

Further, the inventors confirmed that the surface fatigue strength under a usage environment of stronger than 300° C. and weaker than 400° C. was greatly affected by the surface properties, in particular the extent of the surface incompletely hardened layer.

In the past, the effects of the surface properties on the fatigue strength were analyzed by the depth of grain boundary oxidation such as such in for example *Netsushori (Heat Treatment)* (vol. 30, no. 5, pp. 240-246, 1990), but the inventors investigated this and found that what was critical was the extent of the incompletely hardened layer. It is possible to measure the surface X-ray diffraction half width as well to estimate the extent of the incompletely hardened layer. Therefore, they thought that from the viewpoint of the surface properties, it would be preferable to use the surface X-ray half width as an indicator of the improvement in surface fatigue strength. Furthermore, they discovered that it is critical that the depth of the incompletely hardened layer be less than 5 μm. They engaged in in-depth research based on the above and as a result completed the present invention.

First, the reasons for definition of the production process and structure important for the steel part of the present invention will be explained:

[Steel Part Carbonitrided, Then Induction Hardened]

As explained above, by carbonitridation, then induction hardening, a further improvement in the surface fatigue strength becomes possible. Induction hardening causes the surface of the part to harden, so the cooling after the earlier performed carbonitridation is preferably oil or salt quenching with its relatively small cooling rate from the viewpoint of suppressing strain. With water or other high cooling ability hardening, the heat treatment strain at the time of hardening becomes large, so this is not preferred. Conversely, with the small cooling rate furnace cooling, Cr, Mo, etc. precipitate as carbides during the cooling and end up being lost, so this is also not preferred. The total depth of carburization at the time of carbonitridation differs depending on the size of the part, but in a small part is 0.3 mm or more as a rule of thumb and in a large part is 0.8 mm or more as a rule of thumb.

Regarding the heating method at the time of induction hardening, there is no need to employ any particularly special technique. A general method is sufficient. For example, the frequency should be around 400 kHz if a small part and around 5 kHz if a large part as a general rule of thumb. The heating temperature is 800° C. to 900° C. as a rule of thumb.

The cooling medium used for the quenching has to be water, a polymer quenching agent, or other water-based medium with a large cooling ability used in a state strictly controlled so as not to exceed of usage temperature of 40° C. This enables the amount of surface residual austenite to be limited to less than 15 vol % and enables the depth of the incompletely hardened layer to be limited to less than 5 μm.

After induction hardening, as with general carburized hardened parts or carbonitrided hardened parts, the part is preferably tempered at a low temperature of around 150° C. to secure the toughness of the part.

Furthermore, in actual steel parts, the fact of being a steel part carbonitrided, then induction hardened can be discerned from the distribution of structures observed under an optical microscope in a microsample taken from the steel part and Nital corroded, the distribution of hardness from the surface to the core, and the distribution of C and distribution of N from the surface to the core measured by EPMA.

[Surface N Concentration of 0.1 to 0.8 Mass % and Sum of N Concentration and C Concentration of, by Mass %, 1.0 to 2.0 Mass %]

The surface fatigue strength of a part is determined at the surface or at the extremely shallow layer immediately below the surface, so the surface N concentration and C concentration are important. From the viewpoint of imparting softening resistance, the N concentration is made 0.1 to 0.8 mass %. If the N concentration is less than 0.1 mass %, the softening resistance imparted is insufficient, while if over 0.8 mass %, the drop in the Ms point makes it impossible to limit the amount of surface residual austenite to less than 15 vol %. The preferable range of the N concentration is 0.5 to 0.8%. Note that the surface N concentration by general carbonitridation is meant for imparting hardenability, so is usually about 0.1 mass % and is at most 0.4% or so. The objective is different from the present invention.

Further, the sum of the surface N concentration and C concentration is made 1.0 to 2.0 mass %. If the sum of the N concentration and C concentration is less than 1.0 mass %, the hardness of the part is insufficient. Over 1.4% is preferable, but if over 2.0 mass %, the drop in the Ms point makes it extremely difficult to limit the amount of surface residual austenite to less than 15 vol %, so in the present invention, the range was made 1.0 to 2.0 mass %. The preferable range is 1.4 to 2.0 mass %.

[Amount of Surface Residual Austenite of Less than 15 Vol %]

The surface residual austenite is transformed to martensite by work resulting from the surface pressure under usage conditions and changes to low carbon martensite and carbides so causes the part to change in shape. If the amount of surface residual austenite becomes 15 vol % or more, the changes in shape cause degradation of the surface fatigue strength, so the amount has to be limited to less than 15 vol %. Preferably it is less than 10 vol %. To limit the amount of austenite to less than 15 vol %, it is necessary to at least apply carbonitridation for making the N concentration 0.8 mass % or less and making the sum of the N concentration and C concentration 2.0 mass % or less. However, when the part is small or the amount of spraying of the quenching cooling medium using water or a polymer quenching agent not beyond the later mentioned usage temperature of 40° C. is large relative to the part and the cooling rate at the time of quenching is large, the amount of austenite may exceed 15 vol %. In this case, it is necessary to raise the usage temperature of the quenching cooling medium somewhat to a range not exceeding 40° C., reduce the amount sprayed, perform sub zero processing after induction hardening, or make other adjustments. It is necessary to run preliminary tests to establish the conditions for limiting the amount of austenite to less than 15 vol %.

[Depth of Incompletely Hardened Layer From Surface of Less than 5 μm]

When carburization hardening or carbonitridation hardening the steel material, the oxygen entering from the surface at the time of carburization and the alloy elements in the steel material (Si, Mn, Cr, etc.) bond to cause a loss in the alloy elements and insufficient hardening in the region of about 10 μm or more from the surface. This insufficiently hardened region is broadly referred to as the "incompletely hardened layer". By performing both carbonitridation and induction hardening and quenching by a cooling medium, used for the quenching, of water, a polymer quenching agent, or other water-based medium with a large cooling ability used in a state strictly controlled so as not to exceed of usage temperature of 40° C., the depth of the incompletely hardened layer from the surface can be limited to less than 5 μm through the increase in the cooling rate at the time of quenching.

The inventors discovered by investigations, as shown in FIG. 1, that around a depth of the incompletely hardened layer of 5 μm, at less than 5 μm, the surface fatigue strength is greatly improved. They observed parts after fatigue strength tests in detail whereupon they learned that at a depth of the incompletely hardened layer of 5 μm or more, about half the circumference or more of the individual crystal grains near the surface is surrounded by the incompletely hardened layer, so at the time of use, the crystal grains easily peel off. Note that even if the depth of grain boundary oxidation is over 5 μm, there is no problem in terms of the surface fatigue strength.

[Surface X-Ray Diffraction Half Width of 6.0 Degrees or More]

If the X-ray diffraction half width is less than 6.0 degrees, a sufficient surface fatigue strength cannot be obtained. By making it 6.0 degrees or more, a surface fatigue strength more superior than in the past can be obtained, so the value was made 6.0 degrees or more. An X-ray diffraction half width of 6.0 degrees corresponds to an ordinary temperature hardness of 55 HRC or so in the case of no work hardening by shot peening and no residual stress of compression given and was made the lower limit for obtaining the surface fatigue strength. 6.2 degrees or more is preferable.

To realize this, it is necessary to at least perform carbonitridation making the sum of the surface N concentration and C concentration 1.0 to 2.0 mass %, then perform induction hardening using for the cooling medium water or a polymer quenching agent not exceeding the usage temperature 40° C. However, if the part is large or if the amount of spraying of the quenching cooling medium is small relative to the part, the cooling rate at the time of quenching becomes insufficient and the X-ray half width may become less than 6.0 degrees. In that case, it is sufficient to lower the usage temperature of the cooling medium, increase the amount of spraying, or make other adjustments. It is necessary to run preliminary tests to establish the conditions resulting in a width of 6.0 degrees or more, preferably 6.2 degrees or more. Note that the conditions of the quenching cooling medium have to be made conditions by which an amount of surface residual austenite of less than 15 vol % is simultaneously achieved.

Here, the "X-ray diffraction half width" means the half width of the peak when using a micro X-ray residual stress measuring device (Cr bulb) to measure the α-Fe (211) plane over 60 seconds.

Furthermore, when the bending fatigue strength sought from the part is high or otherwise shot peening is required, it is necessary to stop at light shot peening of an arc height of about 0.3 mmA to secure an X-ray diffraction half width of 6.0 degrees or more.

Further, the carbonitrided induction hardened part according to the present invention is not inhibited in effect in any way even if further treated after induction hardening by sub zero treatment, tempering, WPC treatment, barrel polishing, gear grinding, honing, and other additional treatment so long as the amount of surface residual austenite and the X-ray diffraction half width are in the scope of the invention.

Next, the reasons for definition of the chemical ingredients of the steel of the present invention will be explained. Note that the % described here means mass %.

C: 0.005 to 0.8%

C is an element important for obtaining the strength of the steel, but can be replaced by addition of Mn, Cr, and other quenchability improving elements, so should be 0.005% or more. Therefore, in the present invention, the lower limit of the amount of C was made 0.005%. However, if the content exceeds 0.8%, the machinability and forgeability at the time of fabrication of the part are remarkably impaired, so the upper limit was made less than 0.8%. The most preferable amount of addition is 0.1 to 0.6%.

Si: 2.0% or Less

Si need not be added and may be of the level of an unavoidable impurity. If added, it improves the softening resistance of the hardened layer and thereby has the effect of improvement of the surface fatigue strength. To obtain this effect, it is preferably made 0.2% or more. However, if over 2.0%, the decarburization at the time of forging becomes remarkable, so 2.0% was made the upper limit. The most preferable amount of addition is 0.2 to 2.0%.

Mn: 0.2 to 3.0%

Mn is an element effective for improving the hardenability and, further is an element effective for improving the softening resistance. To obtain this effect, 0.2% or more must be added. However, if over 3.0%, the steel material becomes too hard at the time of production and the cuttability of the steel bars etc. are obstructed, so 3.0% was made the upper limit. The most preferable amount of addition is 0.2 to 2.0%.

P: 0.03% or Less

P is included as an unavoidable impurity. It segregates at the grain boundaries to lower the toughness, so must be reduced as much as possible. It must be limited to 0.03% or less.

S: 0.005 to 0.10%

S must be present in 0.005% or more from the viewpoint of the machineability. Therefore, in the present invention, the lower limit of the S amount was made 0.005%. However, if over 0.10%, the forgeability is inhibited, so 0.10% was made the upper limit. The most preferable amount of addition is 0.01 to 0.03%.

Ni: 3.0% or Less (Including 0%)

Ni need not be added. If added, it has the effect of further improving the toughness. To obtain that effect, it is preferably made 0.2% or more. However, if over 3.0%, the machineability deteriorates, so 3.0% was made the upper limit. The most preferable amount of addition is 0.2 to 2.0%.

Cr: 5.0% or Less (Including 0%)

Cr need not be added. If added, it has the effect of improving the softening resistance of the hardened layer and thereby improving the surface fatigue strength. To obtain that effect, it is preferably made 0.2% or more. However, if over 5.0%, the machineability deteriorates, so 5.0% was made the upper limit. The most preferable amount of addition is 0.2 to 2.0%.

Mo: 2.0% or Less (Including 0%)

Mo need not be added. If added, it has the effect of improving the softening resistance of the hardened layer and thereby improving the surface fatigue strength and, further, has the effect of toughening the hardened layer to improve the bending fatigue resistance. To obtain that effect, it is preferably made 0.01% or more. However, even if added over 2.0%, the effect becomes saturated and the economy is impaired, so 2.0% was made the upper limit. The most preferable upper limit is 0.7%.

W: 1.0% or Less (Including 0%)

W need not be added. If added, it has the effect of improving the softening resistance of the hardened layer and thereby improving the surface fatigue strength. To obtain that effect, it is preferably made 0.1% or more. However, if over 1.0%, the machineability deteriorates, so 1.0% was made the upper limit. The most preferable amount of addition is 0.1 to 0.4%.

B: 0.0050% or Less (Including 0%)

B need not be added. If added, it contributes to the improvement of the hardenability. To obtain that effect, it is preferably made 0.0006% or more. However, even if over 0.0050%, the effect is saturated, so 0.0050% was made the upper limit. The most preferable amount of addition is 0.0006 to 0.0040%.

O: 0.0050% or Less,

O is present in the steel as alumina, titania, and other oxide-based inclusions, but if O is large, the oxides end up becoming large in size. These become starting points leading to breakage of the power transmission parts, so the content must be limited to 0.0050% or less. The smaller the amount, the more preferable, so 0.0020% or less is preferable. Furthermore, when oriented toward longer life, 0.0015% or less is preferable.

N: 0.003 to 0.03%

N forms various types of nitrides to effectively act to make the austenite structure finer in grain at the time of induction hardening, so 0.003% or more is necessary. However, if over 0.03%, it remarkably impairs the forgeability, so 0.03% was made the upper limit. The most preferable amount of addition is 0.003 to 0.02%.

One or Both of Al: 0.005 to 0.2% and Ti: 0.005 to 0.2%

Al and Ti precipitate and disperse as nitrides in the steel to effectively act to make the austenite structure finer in grain at the time of induction hardening, so one or both of Al and Ti have to be added in amounts of 0.005% or more. However, if over 0.2%, the precipitates become coarser and cause embrittlement of the steel, so the upper limits were respectively made 0.2%. It is most preferable to add Al in 0.005 to 0.05%.

One or Both of V: 0.3% or Less (Including 0%) and Nb: 0.3% or Less (Including 0%)

V and Nb need not be added, but addition causes the V and Nb to precipitate and disperse as nitrides in the steel and thereby is effective for making the austenite structure finer in grain at the time of induction hardening. To obtain these effects, one or both of V and Nb must be respectively added in amounts of 0.01% or more. However, even if respectively added in over 0.3%, the effects become saturated and the economy is impaired, so the respective upper limits were made 0.3%. It is most preferable to add V in 0.1 to 0.2%.

One or More Elements Selected from the Group of Ca: 0.0005 to 0.01%, Mg: 0.0005 to 0.01%, Zr: 0.0005 to 0.05%, and Te: 0.0005 to 0.1%

Furthermore, when improvement in the bending fatigue strength is sought from the part, it is possible to add one or more elements selected from the group of Ca, Mg, Zr, and Te in the following contents. These ingredients are elements suppress flattening of the MnS and improve the bending fatigue strength much more for the bending fatigue breakage of the gears or fatigue breakage of the bottom of splines of the shaft parts. That is, to give an effect of stretching the MnS, at least one element selected from the group comprised of Ca in 0.0005 to 0.01%, Mg in 0.0005 to 0.01%, Zr in 0.0005 to 0.05%, and Te in 0.0005 to 0.1% is included. However, even if including the elements in amounts over the above, the effects become saturated and the economy is impaired, so the respective upper limits were set.

Further, in addition to the chemical ingredients defined above, it is possible to include Sn, Zn, Rem, Pb, Sb, etc. in a range not impairing the effects of the present invention.

EXAMPLES

Below, the present invention will be specifically explained using examples.

Steel materials having the chemical compositions shown in Table 1 were forged and annealed, then were machined to respectively fabricate two small roller test pieces having cylindrical parts of diameters of 26 mm and widths of 28 mm and one large roller test piece having a diameter of 130 mm and a width of 18 mm for use for roller pitching fatigue test pieces. After this, the small roller test pieces and the large roller test pieces were treated as follows as shown in Table 2.

No. 1 to No. 17 were carbonitrided (950° C.×5 hour carburization by RX gas→850° C.×4 hour carbonitridation by ammonia and RX gas→oil quenching) and then induction hardened (frequency 100 kHz, heating temperature 850° C.). For the cooling medium at the time of induction hardening, fresh water or a polyvinyl pyrrolidone polymer quenching agent was used as shown by the cooling method at the time of induction hardening of Table 2. After this, these materials were tempered at 180° C. for 90 minutes and used for fatigue tests.

No. 18 was carbonitrided (950° C.×5 hour carburization by RX gas→850° C.×4 hour carbonitridation by ammonia and RX gas→3 oil quenching), then tempered at 180° C. and used for the fatigue tests.

No. 19 was carburized (950° C.×5 hour carburization by RX gas→oil quenching) and then induction hardened (frequency 100 kHz, heating temperature 850° C.). For the cooling medium at the time of induction hardening, fresh water was used as shown by the cooling method at the time of induction hardening of Table 2. After this, the material was tempered at 180° C. for 90 minutes and used for a fatigue test.

No. 20 was carbonitrided (950° C.×5 hour carburization by RX gas→850° C.×4 hour carbonitridation by ammonia and RX gas→oil quenching) then induction hardened (frequency 100 kHz, heating temperature 850° C.). For the cooling medium at the time of induction hardening, fresh water or a polyvinyl pyrrolidone polymer quenching agent was used as shown by the cooling method at the time of induction hardening of Table 2. After this, these material was tempered at 180° C. for 90 minutes, shot peened by an arc height of 1.0 mmA (using φ0.8 mm steel balls) and used for fatigue tests.

One above fabricated large roller test piece and one small roller test piece were used to run roller pitching fatigue tests. The roller pitching fatigue test was performed by pushing the large roller test piece against the small roller test piece by a surface pressure of a Hertz's stress of 4000 MPa, making them rotate with circumferential speed directions of the two roller test pieces at the contact parts made the same directions and with a slip rate of −40% (compared with small roller test piece, large roller test piece had 40% larger peripheral speed of the contact part) and using the number of rotations of the smaller roller test piece up to when pitching occurs at the small roller test piece as the lifetime. To make the surface temperature of the small roller test piece become 350° C. due to the heat of friction at the time of the test, the temperature of the gear oil supplied to the contact parts was made 90° C. and the flow rate was made 2 liters per minute. The occurrence of pitching was detected by a vibration meter provided at the tester. After vibration was detected, the rotation of the two roller test pieces was stopped and the occurrence of pitching and the number of rotations were checked. The roller test pieces were investigated for material by the following procedure using the remaining small roller test pieces not used for the roller pitching fatigue tests. The surface N concentration and C concentration were determined by cutting the circumferential surface of the test piece in the vertical direction, mirror polishing the cut surface, then analyzing the surfacemost part by EPMA. The amount of residual austenite and the X-ray diffraction half width were obtained by direct measurement of the circumferential surface by the X-ray method. The depth of the incompletely hardened layer from the surface was measured by cutting the circumferential surface of the test piece in the vertical direction, mirror polishing the cut surface, then etching it and judging the incompletely hardened structure. The austenite crystal grain number was found by cutting the circumferential surface of the test piece vertically, mirror polishing the cut surface, measuring a part of the cut surface very close to the circumferential surface in accordance with JIS G 0551. The results are shown in Table 2.

As shown in Table 2, it becomes clear that the roller test pieces of the invention examples of No. 1 to No. 14 had lifetimes of 10 million cycles or more and had superior pitching fatigue strength (surface fatigue strength).

As opposed to this, the comparative example of No. 15 where the temperature of the tap water at the time of induction hardening was off from the recommended less than 40° C. had a fatigue test life of a short 8,152,000 cycles. This is believed to be because due to the high water temperature and therefore the drop in the cooling rate at the time of hardening, the surface residual austenite cannot be limited to less than 15 vol % and the surface X-ray diffraction half width did not reach 6.0 degrees.

The comparative example of No. 16 where the surface N concentration is outside is outside the scope of ingredients defined in the present invention had a fatigue test life of a short 8,068,000 cycles. This is believed because the high N concentration results in the Ms point falling and therefore the surface residual austenite being unable to be limited to less than 15 vol %.

The comparative example of No. 17 where the sum of the surface N concentration and C concentration is outside the scope of ingredients defined in the present invention had a fatigue test life of a short 5,663,000 cycles. This is believed because the high sum of the N concentration and C concentration results in the Ms point falling and therefore the surface residual austenite being unable to be limited to less than 15 vol % and, further, the surface X-ray diffraction half width not reaching 6.0 degrees.

The comparative example of No. 18 not hardened by induction hardening after carbonitridation had a fatigue test life of an extremely short 612,000 cycles. This is believed because no induction hardening was performed, so the cooling rate at the time of hardening was small and the depth of the incompletely hardened layer became 5 μm or more.

No. 19, which was not nitrided, had a fatigue test life of an extremely short 773,000 cycles. This is believed because no nitridation was performed, so the temper softening resistance became insufficient and therefore the life became shorter.

No. 20, which was shot peened, had a fatigue test life of a low 7,655,000 cycles. This is believed because the shot peening caused the X-ray diffraction half width to become lower.

TABLE 1

| Test no. | Class | Chemical composition (mass %) | | | | | | | | | |
|---|---|---|---|---|---|---|---|---|---|---|---|
| | | C | Si | Mn | P | S | Ni | Cr | Mo | W | B |
| 1 | Inv. ex. | 0.20 | 0.25 | 0.73 | 0.019 | 0.015 | — | 1.05 | — | — | — |
| 2 | Inv. ex. | 0.78 | 0.25 | 0.72 | 0.020 | 0.015 | — | 1.05 | — | — | — |
| 3 | Inv. ex. | 0.22 | 2.00 | 0.72 | 0.019 | 0.016 | — | 1.04 | — | — | — |
| 4 | Inv. ex. | 0.21 | 0.24 | 2.97 | 0.020 | 0.050 | — | 1.05 | — | — | — |
| 5 | Inv. ex. | 0.005 | 0.25 | 0.75 | 0.008 | 0.005 | — | 1.05 | — | — | 0.0023 |
| 6 | Inv. ex. | 0.19 | 0.25 | 0.73 | 0.014 | 0.098 | — | 1.05 | 0.17 | — | — |
| 7 | Inv. ex. | 0.20 | 0.26 | 0.73 | 0.021 | 0.016 | 2.99 | 1.05 | — | — | — |
| 8 | Inv. ex. | 0.20 | 0.03 | 0.73 | 0.020 | 0.016 | — | 4.97 | — | — | — |
| 9 | Inv. ex. | 0.21 | 0.26 | 0.72 | 0.019 | 0.015 | — | — | — | — | — |
| 10 | Inv. ex. | 0.20 | — | 0.07 | 0.022 | 0.030 | — | 1.04 | 2.00 | — | — |
| 11 | Inv. ex. | 0.21 | 0.26 | 0.73 | 0.020 | 0.015 | — | 1.05 | — | 0.98 | — |
| 12 | Inv. ex. | 0.20 | 0.24 | 0.73 | 0.020 | 0.015 | — | 1.04 | — | — | — |
| 13 | Inv. ex. | 0.20 | 0.25 | 0.73 | 0.029 | 0.015 | — | 1.05 | — | — | — |
| 14 | Inv. ex. | 0.21 | 0.25 | 0.72 | 0.020 | 0.016 | — | 1.04 | — | — | — |
| 15 | Comp. ex. | 0.20 | 0.25 | 0.73 | 0.019 | 0.015 | — | 1.05 | — | — | — |
| 16 | Comp. ex. | 0.20 | 0.25 | 0.73 | 0.019 | 0.015 | — | 1.05 | — | — | — |
| 17 | Comp. ex. | 0.20 | 0.25 | 0.73 | 0.019 | 0.015 | — | 1.05 | — | — | — |
| 18 | Comp. ex. | 0.20 | 0.25 | 0.73 | 0.019 | 0.015 | — | 1.05 | — | — | — |
| 19 | Comp. ex. | 0.20 | 0.25 | 0.73 | 0.019 | 0.015 | — | 1.05 | — | — | — |
| 20 | Comp. ex. | 0.21 | 0.25 | 0.72 | 0.020 | 0.016 | — | 1.04 | — | — | — |

| Test no. | Class | Chemical composition (mass %) | | | | | | |
|---|---|---|---|---|---|---|---|---|
| | | O | N | Al | Ti | V | Nb | Others |
| 1 | Inv. ex. | 0.0012 | 0.0119 | 0.030 | — | — | — | — |
| 2 | Inv. ex. | 0.0008 | 0.0122 | 0.033 | — | — | — | — |
| 3 | Inv. ex. | 0.0011 | 0.0292 | 0.188 | — | — | — | Mg: 0.0010 |
| 4 | Inv. ex. | 0.0049 | 0.0105 | 0.029 | — | — | — | — |
| 5 | Inv. ex. | 0.0045 | 0.0125 | 0.030 | — | — | — | Te: 0.049 |
| 6 | Inv. ex. | 0.0013 | 0.0119 | 0.035 | — | — | — | Ca: 0.0015 |
| 7 | Inv. ex. | 0.0015 | 0.0121 | 0.034 | 0.153 | — | 0.002 | — |
| 8 | Inv. ex. | 0.0015 | 0.0042 | 0.001 | 0.006 | — | — | — |
| 9 | Inv. ex. | 0.0010 | 0.0115 | 0.029 | — | 0.05 | 0.025 | — |
| 10 | Inv. ex. | 0.0012 | 0.0120 | 0.034 | — | — | — | — |
| 11 | Inv. ex. | 0.0012 | 0.0122 | 0.035 | — | — | — | Zr: 0.021 |
| 12 | Inv. ex. | 0.0012 | 0.0033 | 0.005 | — | — | — | — |
| 13 | Inv. ex. | 0.0013 | 0.0123 | 0.035 | — | 0.29 | — | — |
| 14 | Inv. ex. | 0.0012 | 0.0120 | 0.033 | — | — | 0.260 | — |
| 15 | Comp. ex. | 0.0012 | 0.0119 | 0.030 | — | — | — | — |
| 16 | Comp. ex. | 0.0012 | 0.0119 | 0.030 | — | — | — | — |
| 17 | Comp. ex. | 0.0012 | 0.0119 | 0.030 | — | — | — | — |
| 18 | Comp. ex. | 0.0012 | 0.0119 | 0.030 | — | — | — | — |
| 19 | Comp. ex. | 0.0012 | 0.0119 | 0.030 | — | — | — | — |
| 20 | Comp. ex. | 0.0012 | 0.0120 | 0.033 | — | — | 0.260 | — |

TABLE 2

| Test no. | Class | Heat treatment method | Cooling method at time of induction hardening | Surface N concentration (mass %) | Surface C concentration (mass %) | Sum of surface N concentration and C concentration (mass %) |
|---|---|---|---|---|---|---|
| 1 | Inv. ex. | Carbonitridation and induction hardening | 25° C. fresh water | 0.6 | 0.9 | 1.5 |
| 2 | Inv. ex. | Carbonitridation and induction hardening | 25° C. fresh water | 0.8 | 0.8 | 1.6 |
| 3 | Inv. ex. | Carbonitridation and induction hardening | 26° C. fresh water | 0.6 | 1.0 | 1.6 |
| 4 | Inv. ex. | Carbonitridation and induction hardening | 25° C. fresh water | 0.6 | 0.9 | 1.5 |

TABLE 2-continued

| Test no. | Class | | | | |
|---|---|---|---|---|---|
| 5 | Inv. ex. | Carbonitridation and induction hardening | 25° C. fresh water | 0.7 | 0.9 | 1.6 |
| 6 | Inv. ex. | Carbonitridation and induction hardening | 25° C. fresh water | 0.6 | 0.9 | 1.5 |
| 7 | Inv. ex. | Carbonitridation and induction hardening | 29° C. fresh water | 0.1 | 0.9 | 1.0 |
| 8 | Inv. ex. | Carbonitridation and induction hardening | 30° C. fresh water | 0.6 | 0.9 | 1.5 |
| 9 | Inv. ex. | Carbonitridation and induction hardening | 30° C. fresh water | 0.6 | 0.8 | 1.4 |
| 10 | Inv. ex. | Carbonitridation and induction hardening | 31° C. fresh water | 0.8 | 1.2 | 2.0 |
| 11 | Inv. ex. | Carbonitridation and induction hardening | 31° C. fresh water | 0.7 | 0.9 | 1.6 |
| 12 | Inv. ex. | Carbonitridation and induction hardening | 28° C. fresh water | 0.6 | 0.9 | 1.5 |
| 13 | Inv. ex. | Carbonitridation and induction hardening | 36° C. polymer quenching agent | 0.8 | 0.8 | 1.6 |
| 14 | Inv. ex. | Carbonitridation and induction hardening | 39° C. fresh water | 0.6 | 0.9 | 1.5 |
| 15 | Comp. ex. | Carbonitridation and induction hardening | 41° C. fresh water | 0.6 | 0.9 | 1.5 |
| 16 | Comp. ex. | Carbonitridation and induction hardening | 25° C. fresh water | 0.9 | 0.8 | 1.7 |
| 17 | Comp. ex. | Carbonitridation and induction hardening | 25° C. fresh water | 0.8 | 1.3 | 2.1 |
| 18 | Comp. ex. | Carbonitridation | (No high frequency waves) | 0.6 | 0.9 | 1.5 |
| 19 | Comp. ex. | Carburization and induction hardening | 25° C. fresh water | (No nitridation) | 0.8 | 0.8 |
| 20 | Comp. ex. | Carbonitridation, induction hardening, and shot peening | 39° C. fresh water | 0.6 | 0.9 | 1.5 |

| Test no. | Class | Amount of residual austenite (mass %) | Depth of incompletely hardened layer (μm) | Austenite crystals | X-ray diffracttion half width | Fatigue test life (cycles) |
|---|---|---|---|---|---|---|
| 1 | Inv. ex. | 9 | 0 | 11 | 6.6 | 20,882,000 |
| 2 | Inv. ex. | 9 | 0 | 11 | 6.7 | 21,829,000 |
| 3 | Inv. ex. | 5 | 4 | 12 | 6.0 | 42,495,000 |
| 4 | Inv. ex. | 15 | 3 | 11 | 6.2 | 20,142,000 |
| 5 | Inv. ex. | 8 | 0 | 11 | 6.6 | 22,384,000 |
| 6 | Inv. ex. | 8 | 0 | 11 | 6.6 | 20,020,000 |
| 7 | Inv. ex. | 1 | 0 | 12 | 7.1 | 12,231,000 |
| 8 | Inv. ex. | 5 | 3 | 11 | 6.2 | 50,032,000 |
| 9 | Inv. ex. | 6 | 0 | 11 | 6.6 | 10,501,000 |
| 10 | Inv. ex. | 9 | 0 | 11 | 6.4 | 38,561,000 |
| 11 | Inv. ex. | 8 | 0 | 11 | 6.4 | 22,502,000 |
| 12 | Inv. ex. | 8 | 0 | 10 | 6.6 | 21,601,000 |
| 13 | Inv. ex. | 8 | 0 | 11 | 6.5 | 25,603,000 |
| 14 | Inv. ex. | 6 | 0 | 11 | 6.4 | 20,947,000 |
| 15 | Comp. ex. | 18 | 0 | 11 | 5.8 | 8,152,000 |
| 16 | Comp. ex. | 22 | 0 | 11 | 6.2 | 8,068,000 |
| 17 | Comp. ex. | 30 | 0 | 11 | 5.5 | 5,663,000 |
| 18 | Comp. ex. | 14 | 10 | 8 | 5.9 | 612,000 |
| 19 | Comp. ex. | 5 | 3 | 11 | 6.6 | 773,000 |
| 20 | Comp. ex. | 3 | 0 | 11 | 5.3 | 7,655,000 |

INDUSTRIAL APPLICABILITY

In the present invention, a carbonitrided induction hardened steel part having a high surface fatigue strength, in particular a gear, continuously variable transmission, constant velocity joint, hub, or other part having a high surface fatigue strength able to be applied to power transmission parts of automobiles etc. can be provided and thereby higher output and lower cost of automobiles is greatly contributed to.

The invention claimed is:

1. A carbonitrided induction hardened steel part superior in surface fatigue strength at high temperature comprising steel, the steel comprising, by mass %, C: 0.005 to 0.22%,
Si: 2.0% or less,
Mn: 0.2 to 3.0%,
P: 0.03% or less,
S: 0.005 to 0.10%,
Ni: 3.0% or less (including 0%),
Cr: 5.0% or less (including 0%),
Mo: 2.0% or less (including 0%),
W: 1.0% or less (including 0%),
B: 0.0050% or less (including 0%),
O: 0.0050% or less, and
N: 0.003 to 0.03%,
one or both of
Al: 0.005 to 0.2% and
Ti: 0.005 to 0.2% and
one or both of
V: 0.3% or less and
Nb: 0.3% or less, and a balance of iron and unavoidable impurities,
wherein the steel part is carbonitrided, and then induction hardened, and wherein the steel part has a surface N concentration of 0.1 to 0.8 mass %, a sum of N and C concentrations of 1.0 to 2.0 mass %, a surface residual austenite in an amount of less than 10 vol %, an incompletely hardened layer at a depth from the surface of less than 5 μm, and a surface X-ray diffraction half width of 6.0 degrees or more.

2. The carbonitrided induction hardened steel part as set forth in claim 1, wherein the steel further comprises one or more of Ca: 0.0005 to 0.01%,
Mg: 0.0005 to 0.01%,
Zr: 0.0005 to 0.05%, and
Te: 0.0005 to 0.1%.

3. The carbonitrided induction hardened steel part as set forth in claim 1, wherein the steel part is one of a gear, a continuously variable transmission, a constant velocity joint, and a hub.

4. A method of production of a carbonitrided induction hardened steel part superior in surface fatigue strength at high temperature, the steel part comprising steel, the steel comprising, by mass %, C: 0.005 to 0.22%,
Si: 2.0% or less,
Mn: 0.2 to 3.0%,
P: 0.03% or less,
S: 0.005 to 0.10%,
Ni: 3.0% or less (including 0%),
Cr: 5.0% or less (including 0%),
Mo: 2.0% or less (including 0%),
W: 1.0% or less (including 0%),
B: 0.0050% or less (including 0%),
O: 0.0050% or less, and
N: 0.003 to 0.03%,
one or both of
Al: 0.005 to 0.2% and
Ti: 0.005 to 0.2% and
one or both of V: 0.3% or less and
Nb: 0.3% or less, and a balance of iron and unavoidable impurities, the method comprising:

forming a part,
carbonitriding the part,
then oil or salt quenching the part,
then induction heating the part, and
hardening the part with water or a polymer quenching agent at a temperature of less than 40° C., thereby providing a part having a surfacemost N concentration of 0.1 to 0.8 mass %, a sum of N and C concentrations of 1.0 to 2.0 mass %,
surface residual austenite in an amount of less than 10 vol %, an incompletely hardened layer at a depth from the surface of less than 5 μ, and a surface X-ray diffraction half width of 6.0 degrees or more.

5. The method of production of a carbonitrided induction hardened steel part as set forth in claim 4, wherein the steel further comprises one or more of Ca: 0.0005 to 0.01%,
Mg: 0.0005 to 0.01%,
Zr: 0.0005 to 0.05%, and
Te: 0.0005 to 0.1%.

6. The method of production of a carbonitrided induction hardened steel part as set forth in claim 4, wherein the steel part is one of a gear, a continuously variable transmission, a constant velocity joint, and a hub.

7. The carbonitrided induction hardened steel part as set forth in claim 2, wherein the steel part is one of a gear, a continuously variable transmission, a constant velocity joint, and a hub.

8. The method of production of a carbonitrided induction hardened steel part as set forth in claim 5, wherein the steel part is one of a gear, a continuously variable transmission, a constant velocity joint, and a hub.

* * * * *

UNITED STATES PATENT AND TRADEMARK OFFICE
CERTIFICATE OF CORRECTION

PATENT NO. : 8,328,956 B2  Page 1 of 1
APPLICATION NO. : 12/450544
DATED : December 11, 2012
INVENTOR(S) : Shuji Kozawa et al.

It is certified that error appears in the above-identified patent and that said Letters Patent is hereby corrected as shown below:

In the Specification

Column 2, line 11, change "less than 5 μm" to -- less than 5 μm. --;

Column 3, line 61, change "and weaker than)" to -- and weaker than 400° C) --;

Column 7, line 55, change "or Less" to -- or less --;

Column 7, line 67, change "or Less (Including 0%)" to -- or less (including 0%) --;

Column 8, line 6, change "or Less (Including 0%)" to -- or less (including 0%) --;

Column 8, line 13, change "or Less (Including 0%)" to -- or less (including 0%) --;

Column 8, line 23, change "or Less (Including 0%)" to -- or less (including 0%) --;

Column 8, line 30, change "or Less (Including 0%)" to -- or less (including 0%) --;

Column 8, line 35, change "or Less" to -- or less --;

Column 8, line 52, change "One or Both" to -- One or both --;

Column 8, line 61, change "One or Both" to -- One or both --;

Column 8, line 62, change "or Less (Including 0%)" to -- or less (including 0%) --;

Column 10, line 56, change "is outside is outside" to -- is outside --;

In the Claims
Column 16, line 16, Claim 4, change "less than 5μ, and" to -- less than 5μm, and --.

Signed and Sealed this
Twenty-fourth Day of December, 2013

Margaret A. Focarino
*Commissioner for Patents of the United States Patent and Trademark Office*